United States Patent
Huddle

(10) Patent No.: US 6,208,937 B1
(45) Date of Patent: Mar. 27, 2001

(54) METHOD AND APPARATUS FOR GENERATING NAVIGATION DATA

(75) Inventor: James R. Huddle, Chatsworth, CA (US)

(73) Assignee: Litton Systems Inc., Woodland Hills, CA (US)

( * ) Notice: Subject to any disclaimer, the term of this patent is extended or adjusted under 35 U.S.C. 154(b) by 0 days.

(21) Appl. No.: 09/124,819

(22) Filed: Jul. 29, 1998

(51) Int. Cl.[7] .............................. G06G 7/78; G01C 21/00
(52) U.S. Cl. ..................... 701/221; 701/213; 701/216; 701/220; 701/200; 342/63; 342/64; 342/357.07
(58) Field of Search ........................... 701/200, 215, 701/220, 221, 213, 225, 207, 224; 342/63, 64, 357.01, 357.02, 357.03, 358, 357.08, 120, 353, 357.14, 357.07

(56) References Cited

U.S. PATENT DOCUMENTS

| | | | |
|---|---|---|---|
| 4,954,833 | * 9/1990 | Evans et al. | 342/357 |
| 5,017,926 | * 5/1991 | Ames et al. | 342/353 |
| 5,272,639 | * 12/1993 | McGuffin | 701/207 |
| 5,323,322 | * 6/1994 | Mueller et al. | 701/215 |
| 5,345,241 | * 9/1994 | Huddle | 342/63 |
| 5,455,592 | * 10/1995 | Huddle | 342/359 |
| 5,546,087 | * 8/1996 | Neira | 342/120 |
| 5,617,317 | * 4/1997 | Ignagni | 701/215 |
| 5,640,325 | * 6/1997 | Banbrook et al. | 701/220 |
| 5,801,970 | * 9/1998 | Rowland et al. | 342/63 |
| 5,923,286 | * 7/1999 | Divakaruni | 701/213 |
| 5,948,044 | * 9/1999 | Varley et al. | 701/220 |
| 6,094,164 | * 7/2000 | Murphy | 342/357.07 |

* cited by examiner

Primary Examiner—Jacques H. Louis-Jacques
(74) Attorney, Agent, or Firm—Robert E. Malm

(57) ABSTRACT

The invention is a method and apparatus for generating navigation data. The method comprises the steps of (a) determining the position vector for one or more observation points in an earth-fixed reference frame and (b) determining either (1) the position vector for a target point in the earth-fixed reference frame from directions in either a model-based or a gravity-based reference frame from the one or more observation points to the target point or (2) the directions in either a model-based or a gravity-based reference frame from the one or more observation points to the target point from the position vector for the target point in the earth-fixed reference frame, the model-based reference frame having a vertical axis with a specified orientation with respect to a normal to an ellipsoidal model of the earth and having horizontal axes with specified orientations with respect to the earth-fixed reference, the gravity-based reference frame having a vertical axis with a specified orientation with respect to the gravity vector and having horizontal axes with specified orientations with respect to the earth-fixed reference frame. The apparatus for practicing the method for generating navigation data comprises an inertial navigation system, a GPS antenna and receiver, and direction-finding apparatus.

17 Claims, 3 Drawing Sheets

METHOD AND APPARATUS FOR GENERATING NAVIGATION DATA

CROSS-REFERENCE TO RELATED APPLICATIONS (Not applicable)

STATEMENT REGARDING FEDERALLY SPONSORED RESEARCH AND DEVELOPMENT (Not applicable)

BACKGROUND OF THE INVENTION

This invention relates generally to integrated GPS-inertial navigation systems and more specifically to GPS-inertial navigation systems augmented with direction-finding apparatus.

The velocity $\vec{v}$ of interest in navigating a vehicle relative to the earth using an inertial navigation system is defined by the equation:

$$(d\vec{v}/dt)_N = \vec{a}_{sf} + \vec{g} - \vec{W} \times (\vec{W} \times \vec{R}) - (\vec{W} + \vec{w}) \times \vec{v} \qquad (1)$$

The vector $(d\vec{v}/dt)_N$ is the rate of change of the vehicle's velocity relative to the earth expressed in an inertial navigation system frame of reference. An example of a model-based inertial navigation system frame of reference is a local-level system with origin fixed at the point of tangency to the ellipsoidal model of the earth's gravity potential surface at the present position of the vehicle. The ellipsoidal model of the earth's gravity potential surface is called the normal gravity potential (See Heiskenan & Moritz, "Physical Geodesy", Page 67, W. H. Freeman & Co., 1967). The vector $\vec{a}_{sf}$ is the specific-force acceleration experienced by the inertial navigation system (INS) on board the vehicle. The vector $\vec{g}$ is the gravity vector. The vector $\vec{W}$ is the rotation rate of an earth-fixed frame of reference relative to an inertial frame (i.e. earth's rotation rate vector). The vector $\vec{R}$ is the position vector of the vehicle from the center of the earth. The vector $\vec{w}$ is the rotation rate of the inertial navigation system frame relative to the inertial frame.

If the vehicle is stationary with respect to the earth, the equation above becomes:

$$\vec{a}_{sfg} + \vec{g} - \vec{W} \times (\vec{W} \times \vec{R}) = 0 \qquad (2)$$

Here $\vec{a}_{sfg}$ is the specific-force acceleration that balances gravity and the acceleration resulting from the earth's rotation and causes the vehicle to be stationary with respect to the earth. The specific-force acceleration—$\vec{a}_{sfg}$ in the stationary case is sometimes referred to as the plumb bob gravity since its direction coincides with that of a plumb bob suspended at the vehicle's present position:

$$\vec{a}_{sfg} = -\vec{g} + \vec{W} \times (\vec{W} \times \vec{R}) \qquad (3)$$

The vector $\vec{a}_{sfg}$ is only approximately aligned with the local geodetic vertical $\vec{U}$ which is orthogonal to the normal gravity potential surface of the earth (i.e. the ellipsoidal surface model). The vector $\vec{a}_{sfg}$ deviates from the vector $\vec{U}$ by what is called the deflection of the gravity vertical. The vector $\vec{U}$ is the vertical axis of what is called the local geodetic frame that is comprised of the orthogonal east, north and vertical axes. The deflection of the vertical is the difference in the slope of the ellipsoidal model of the earth's gravity potential surface with respect to the slope of the actual gravity potential surface, which is called the geoid. The plumb bob gravity is orthogonal to the surface of the geoid.

The vector $\vec{a}_{sfg}$ is used to establish the orientation of the level axes of a gravity-based inertial navigation system frame relative to the inertial instrument reference axes during initial alignment of the inertial system. The three orthogonal axes of the inertial system instrument frame usually correspond to the sensing axes of the accelerometers and gyros of the inertial system. The local north component of the earth rate vector $\vec{W}$ is used to determine the orientation of the inertial navigation frame with respect to the instrument frame in the local level plane relative to the local north axis (i.e. the azimuth orientation). This is achieved by observing the direction of the earth's rotation rate vector about the local north axis during the gyrocompassing phase of initial alignment of the inertial system using a combination of gyro and accelerometer measurements. After initial alignment the orientation of the gravity-based inertial navigation frame relative to the model-based frame differs by small amount due to various sources of error.

After initial alignment, when an inertial navigation system is integrated with a GPS navigation system, the differences in the measurements of position and velocity between the INS and the GPS system can be used to periodically correct the "drift" errors in the inertial system computed position, velocity and orientation with respect to the earth. In addition various causes of such errors, such as due to inertial instrument errors in can also be corrected. In such a situation, a GPS-INS navigation system has been demonstrated to have extremely small errors in position and velocity in actual flight tests. In addition, the error in knowledge of the orientation of the inertial instrument frame, and consequently the gravity-based inertial navigation frame, with respect to the earth is quite small. However, an error does exist in the orientation of the gravity-based inertial system navigation frame about the local north and east geodetic axes. This error which is called the tilt, is caused primarily by the deflection of the gravity vertical. If the highest accuracy navigation performance for a GPS-INS or INS-only (free-inertial) system is to be realized, some means must be developed for conveniently and effectively determining the deflection of the vertical throughout any region of interest. Such data can then be employed for constructing a deflection of the vertical database that can be used to compensate the inertial navigation system accelerometer measurements of force such that the deflection of the vertical has a much reduced effect on the accuracy of the navigation solution.

BRIEF SUMMARY OF THE INVENTION

The invention is a method and apparatus for generating navigation data. The method comprises the steps of (a) determining the position vector for one or more observation points in an earth-fixed reference frame and (b) determining either (1) the position vector for a target point in the earth-fixed reference frame from directions in either a model-based or a gravity-based reference frame from the one or more observation points to the target point or (2) the directions in either a model-based or a gravity-based reference frame from the one or more observation points to the target point from the position vector for the target point in the earth-fixed reference frame.

The model-based reference frame has a vertical axis with a specified orientation with respect to a normal to an ellipsoidal model of the earth and horizontal axes with specified orientations with respect to the earth-fixed reference frame. The gravity-based reference frame has a vertical axis with a specified orientation with respect to the gravity vector and horizontal axes with specified orientations with respect to the earth-fixed reference frame.

The apparatus for practicing the method for generating navigation data comprises an inertial navigation system, a GPS antenna and receiver, and direction-finding apparatus. The axes of maximum sensitivity for the accelerometers and gyros of the inertial navigation system define an instrument reference frame which is referenced to the gravity-based reference frame. The GPS antenna is fixed in the body reference frame, and the direction-finding apparatus is fixed in a direction-finder reference frame. There is at least one point fixed in both the instrument reference frame and the direction-finder reference frame. The GPS receiver and the inertial navigation system work in concert to determine the position vector in an earth-fixed reference frame of an instrument reference point fixed in the instrument reference frame.

DETAILED DESCRIPTION OF THE INVENTION

The invention is a method and apparatus for measuring the deflection of the vertical using a GPS-INS navigation system whose major errors are due to the deflection of the vertical. The method comprises a procedure in which the direction from an assumed perfectly-aligned inertial system navigation frame in a vehicle to an accurately surveyed point on the ground is computed using the accurate position solution from the GPS-INS system in the aircraft. Since the actual inertial system navigation frame is misaligned from the true local geodetic east, north and vertical axes, primarily due to the deflection of the vertical, the computed direction to the surveyed point from the aircraft using the actual inertial system navigation frame as a reference, will be in error, primarily due to the deflection of the vertical.

The apparatus for practicing the method for measuring the deflection of the vertical comprises an inertial navigation system, a GPS antenna and receiver, and a direction-finding apparatus. The sensing axes of the accelerometers and gyros of the inertial navigation system define the inertial instrument reference frame, whose orientation is continuously computed by the inertial system relative to the inertial navigation system reference frame. The inertial navigation system reference frame is approximately aligned to the local east, north and vertical geodetic axes at the present position of the vehicle. The GPS antenna is fixed in the aircraft body reference frame that is known relative to the inertial instrument reference frame. The direction-finding apparatus is fixed in a direction-finder reference frame that is known relative to the inertial instrument reference frame.

An integrated global positioning system (GPS) and inertial navigation system (INS) augmented with direction-finding apparatus is capable of measuring the deflection of the vertical and accomplishing precise land surveys. "Deflection of the vertical" is a term of art used to designate the departure of the actual (plumb bob) gravity vector from a vector orthogonal to the earth's normal gravity potential surface which is modeled as an ellipsoid.

Figure 1:
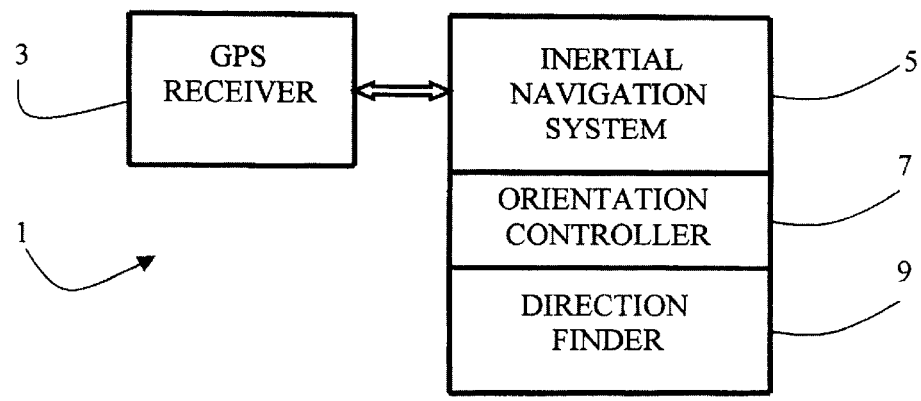
FIG. 1 shows a block diagram of the apparatus for generating navigation data.

The augmented INS is shown in FIG. 1. The augmented INS 1 consists of a GPS receiver 3, an INS 5, an orientation controller 7, and a direction finder (DF), 9. In mounting the augmented INS 1 in, for example, an airborne vehicle, the INS 5 is attached to the vehicle, the orientation controller 7 is attached to the INS 5, and the direction finder 9 is attached to the orientation controller 7. The direction finder 9 has an angular field of view, which can be oriented in a specified direction by the INS 5 sending an appropriate command to the orientation controller 7, which in turn orients, the direction finder 9 in the specified direction. Means for orienting devices to point in specified directions are well known in the art and will not be described here.

A GPS-INS system has been demonstrated in flight tests to have extremely small errors in position (of the order of centimeters) and velocity (of the order of millimeters per second). The error in knowledge of the orientation of the navigation system reference frame with respect to an earth-fixed, local geodetic coordinate system is quite small (on the order of a few arc-seconds). This error in orientation about the north and east geodetic axes, called the tilt, is primarily due to the deflection of the gravity vector; which is a few arc-seconds.

For vehicles moving at speeds of hundreds of knots or more, while the tilt about the north and east geodetic axes is primarily due to the gravity disturbance vector, tilt does not directly relate to the deflection that exists at the instantaneous position of the GPS-INS navigation system. On the other hand, for vehicles moving at speeds of a few knots, tilt correlates highly with the deflection of the vertical at the current position of the GPS-INS navigation system.

Figure 2:
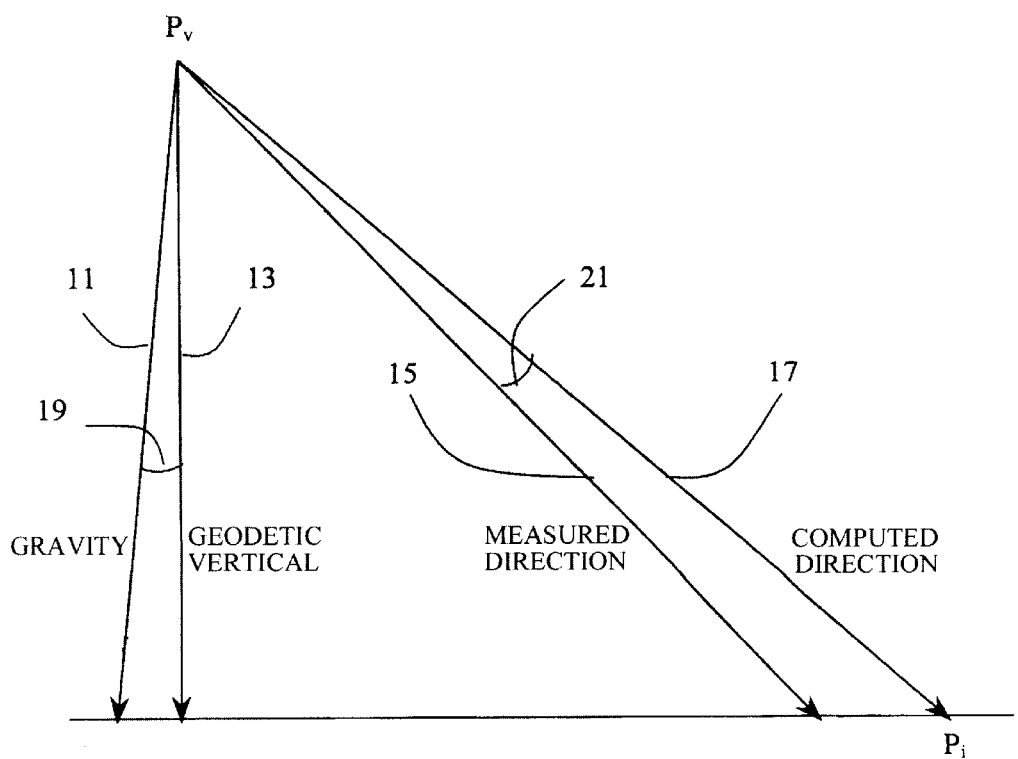
FIG. 2 illustrates the conceptual basis of the invention.

The conceptual basis of the invention is illustrated in FIG. 2. The symbol $P_v$ denotes the vehicle position. The symbol $P_i$ denotes an ith-surveyed point on the earth's surface. The vector 11 denotes the direction of gravity. The vector 13 denotes the normal to the ellipsoidal model of the earth's normal gravity potential surface which is the local geodetic vertical. The vector 17 denotes the computed direction to point $P_I$, assuming the inertial navigation system reference frame has no tilt. The vector 15 denotes the direction to point $P_i$ that would be experienced by the direction finder 9, using the actual inertial navigation system reference frame which is tilted. This direction is in error because of the tilt in the inertial navigation reference frame that results from the deflection of the gravity vector. Thus, the observation of the direction to a surveyed point on the earth's surface with a direction finder provides the means for correctly orienting the inertial navigation frame to the geodetic frame and simultaneously determining the deflection of the vertical at the vehicle's position. The angle 19 by which the inertial navigation frame must be adjusted to coincide with the local geodetic frame can be determined from the angle 21.

Observations of multiple ground points $P_i$ and least squares or equivalent estimation methods can reduce the additive random error in these measurements so that accuracies on the order of 5 microradians (1 arc-second) in measuring the deflection of gravity vector can be realized.

The process for correcting the orientation of the navigation frame is somewhat more complicated than FIG. 2 would suggest. One problem is that there can exist a boresight error between the direction finder reference frame and the inertial instrument reference frame. This boresight error can be measured by well-known laboratory procedures that will not be discussed further here. Alternatively, the boresight error can be measured by observing the error in pointing to surveyed points on the surface of the earth and performing rotational maneuvers of the aircraft about the local vertical. When such a rotation is made the reference frames of the direction finder and inertial instrument reference frame and consequently, the boresight error, rotate with respect to the earth. When this occurs, the tilt error caused by the deflection of the vertical and the pointing error caused by the boresight error become separable and each can be individually determined.

The direction-finding function can be implemented in a number of ways. For example, the art of aerial photogrammetry (aero-triangulation) provides a capability for determining the position vector of a camera system and the orientation of the principal axis in the direction-finder reference frame through the knowledge of the position vectors of pre-surveyed points on the surface of the earth. This is done by measuring the positions of points in overlapping photographs and utilizing a mathematical technique called the "bundle adjustment" (see Karl Krause, with contributions by Peter Waldhausl, PHOTOGRAMMETRY: Fundamentals and Standard Processes, translated by Peter Stewardson, Vol. 1, pp. 275–90, Ferd. Dummler Verlag, Bonn, Germany).

Additionally, the position vectors of points on the surface of the earth that are not known a priori can be determined by measuring their location in overlapping photographs (or digital images) and incorporating these measurements in the bundle adjustment process. The orientation accuracy of the camera principal axis and directions to other points on the ground appearing in an image is a function of the resolution obtainable in the image of a ground target (of the order of micrometers) and the focal length of the camera.

Evolving digital imaging technology appears to offer a number of important developments in resolution enhancement such as electronic shuttering for minimal blurring (which can be further reduced by motion compensation using GPS-INS data), small pixel size near the camera optics diffraction limit (of the order of 2 to 3 micrometers), and averaging methods to obtain sub-pixel resolution. For example, 1-micrometer resolution with a camera focal length of 100 millimeters yields an angular resolution of about 10 microradians.

The camera system may have a large enough field of view as to not require the pointing capability of the orientation controller 7. In this case, the orientation controller 7 can be omitted from the system configuration, the camera system is attached directly to the INS 5, and pointing of the camera system is accomplished by maneuvering the vehicle.

Another way of implementing the direction-finding function is to use a laser range finder which can provide extremely accurate measurements of range (of the order of millimeters) and the orientation of the laser optical axis in the direction-finder reference frame can be determined extremely accurately when retro-reflectors are employed as targets at the points of interest. Since the laser range finder has a very limited field of view, the orientation controller 7 must be commanded to perform an area scan to acquire a target retro-reflector on the ground.

In order to obtain the desired precision in measuring the direction to a surveyed point on the ground or in having the direction finder 9 pointing in a specified direction, the INS 5, the orientation controller 7, and the direction finder 9 must be so-affixed to each other as to permit only controlled changes in orientation between the INS 5 and the direction finder 9, as accomplished by the orientation controller 7. In addition, the elements of the system should be environmentally isolated with respect to temperature, vibration, and shock so as to achieve orientation stability on the order of 5 microradians.

Figure 3:
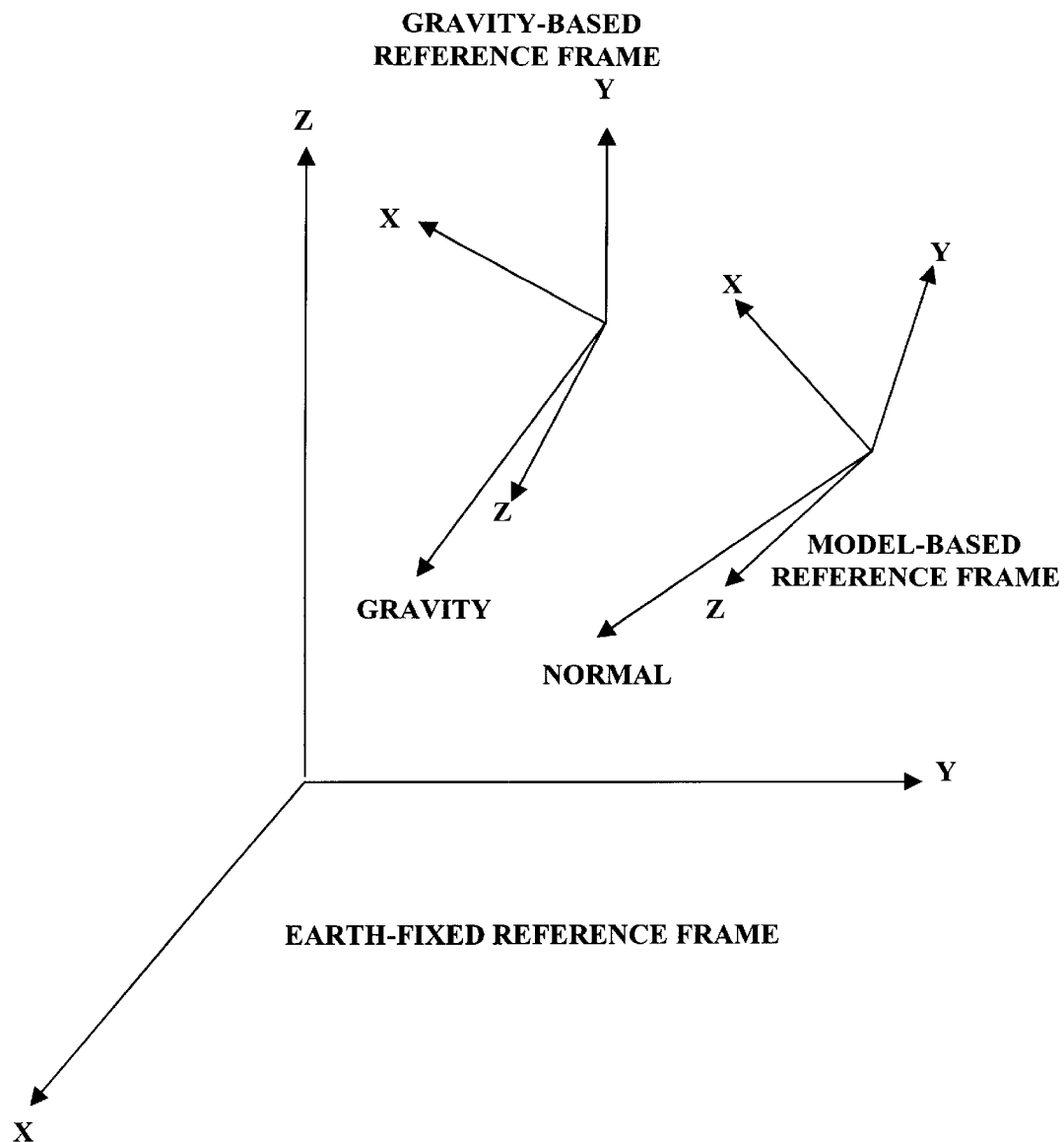
FIG. 3 shows a gravity-based reference frame and a model-based reference frame in the context of an earth-fixed reference frame.
Figure 4:
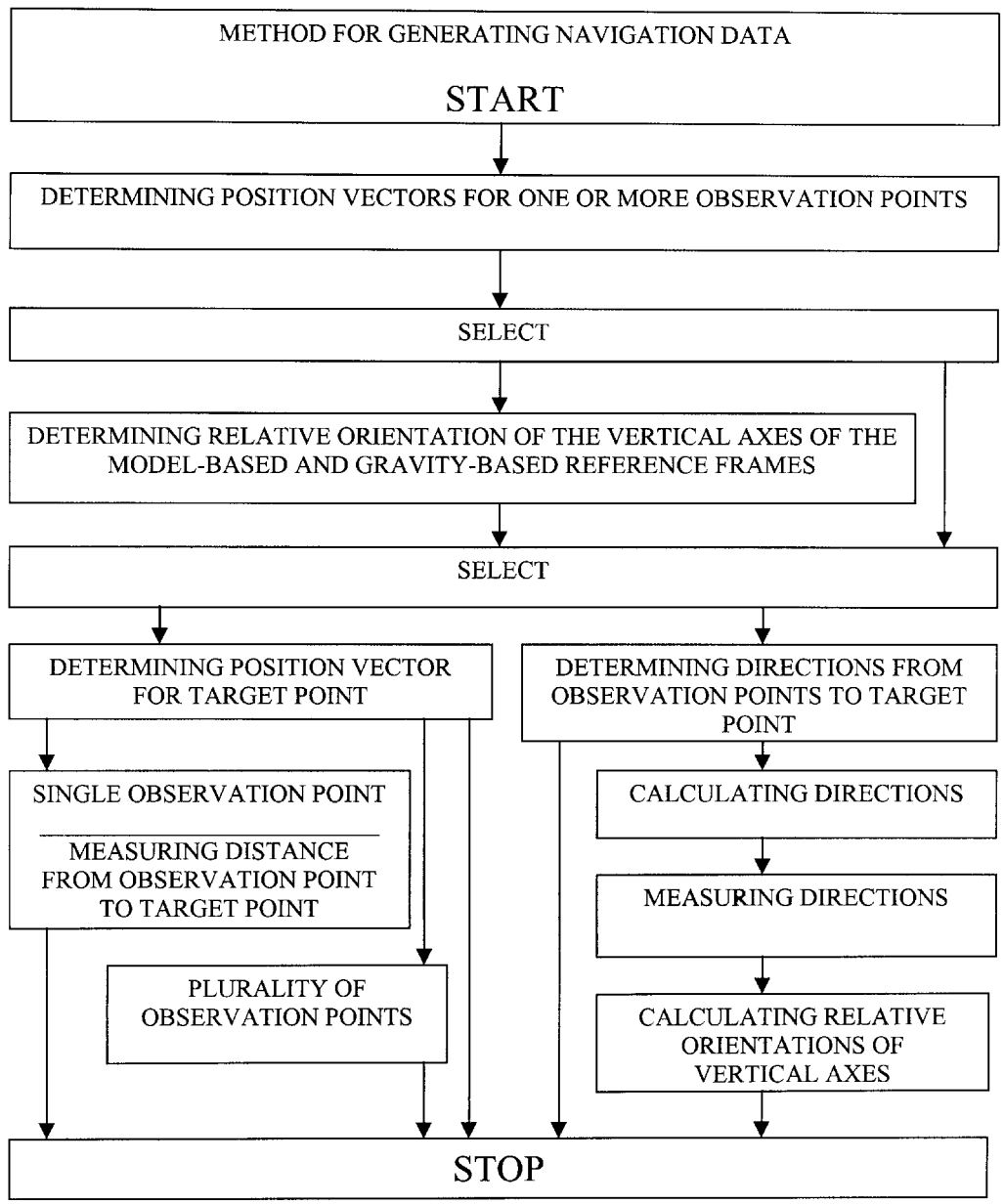
FIG. 4 shows the steps of the method for generating navigation data.

The claims are expressed in terms of an earth-fixed reference frame, a model-based reference frame, and a gravity-based reference frame. These three frames of reference are illustrated in FIG. 3. The steps of the method claims are illustrated in FIG. 4.

What is claimed is:

1. A method for generating navigation data utilizing a GPS-inertial navigation system and a direction-finding apparatus sharing a common platform, the method comprising the steps:
    (a) determining the position vector for one or more observation points in an earth-fixed reference frame;
    (b) determining either (1) the position vector for a target point in the earth-fixed reference frame from directions in either a model-based or a gravity-based reference frame from the one or more observation points to the target point or (2) the directions in either a model-based or a gravity-based reference frame from the one or more observation points to the target point from the position vector for the target point in the earth-fixed reference frame, the model-based reference frame having a vertical axis with a specified orientation with respect to a normal to an ellipsoidal model of the earth and having horizontal axes with specified orientations with respect to the earth-fixed reference, the gravity-based reference frame having a vertical axis with a specified orientation with respect to the gravity vector and having horizontal axes with specified orientations with respect to the earth-fixed reference frame.

2. The method of claim 1 wherein step (a) includes the step:
    (a1) determining the relative orientation of the vertical axes of the model-based and gravity-based reference frames at the one or more observation points.

3. The method of claim 1 wherein step (b) consists of determining the position vector for the target point in the earth-fixed reference frame from directions from the one or more observation points to the target point.

4. The method of claim 3 wherein step (b) involves only one observation point, step (b) including the step:
    (b1) measuring the distance from the observation point to the target point.

5. The method of claim 3 wherein step (b) involves a plurality of observation points.

6. The method of claim 1 wherein step (b) consists of determining directions from the observation points to the target point from the position vector for the target point in the earth-fixed reference frame.

7. The method of claim 6 wherein step (b) comprises the steps:
    (b1) calculating the directions from the one or more observation points to the target point.
    (b2) measuring the directions from the one or more observation points to the target point;
    (b3) calculating for each of the one or more observation points the relative orientation of the vertical axes of the gravity-based and the model-based reference frames.

8. Apparatus for practicing the method of claim 1.

9. Apparatus for generating navigation data comprising:

an inertial navigation system (INS) comprising accelerometers and gyros, the axes of maximum sensitivity for the accelerometers and gyros defining an instrument reference frame, the instrument reference frame being referenced to a gravity-based reference frame, a gravity-based reference frame having a vertical axis with a specified orientation with respect to the gravity vector at the time and place of initialization, the gravity-based reference frame having horizontal axes with specified orientations with respect to the earth-fixed reference frame;

a GPS antenna and receiver, the GPS antenna being fixed in a body reference frame, the body reference frame being referenced to the instrument reference frame, the GPS receiver and the INS working in concert to determine the position vector in an earth-fixed reference frame of an instrument reference point fixed in the instrument reference frame;

a direction-finding apparatus fixed in a direction-finder reference frame, there being at least one point fixed in both the instrument reference frame and the direction-finder reference frame.

10. The apparatus of claim 9 wherein the orientation of the direction-finder reference frame with respect to the instrument reference frame is fixed.

11. The apparatus of claim 9 wherein the orientation of the direction-finder reference frame with respect to the instrument reference frame is adjustable.

12. The apparatus of claim 9 wherein the direction-finding apparatus comprises a camera.

13. The apparatus of claim 9 wherein the direction-finding apparatus comprises a laser apparatus capable of (1) emitting light along a directional axis and (2) detecting light reflected back by an object external to the laser apparatus.

14. The apparatus of claim 13 wherein the laser apparatus includes the capability of measuring the round-trip transit time of light emitted by and reflected back to the laser apparatus.

15. A method for using the apparatus of claim 14, the instrument reference point being at an observation point, the method comprising the steps:

(a) determining the relative orientation of the model-based and gravity-based reference frames, the model-based reference frame having a vertical axis with a specified orientation with respect to a normal to an ellipsoidal model of the earth and having horizontal axes with specified orientations with respect to the earth-fixed reference, the gravity-based reference frame having a vertical axis with a specified orientation with respect to the gravity vector and having horizontal axes with specified orientations with respect to the earth-fixed reference frame;

(b) obtaining the position vector for the instrument reference point in the earth-fixed coordinate system from the INS-GPS receiver combination;

(c) orienting the direction-finding apparatus to point in the direction of a target point;

(d) determining the pointing direction of the direction-finding apparatus;

(e) determining the distance between the instrument reference point and target point;

(f) determining the position vector in the earth-fixed reference frame for the target point utilizing the pointing direction of step (d) and the distance of step (e).

16. A method for using the apparatus of claim 9, the instrument reference point being sequentially at one or more observation points, the method comprising the steps:

(a) obtaining the position vectors for the one or more observation points in the earth-fixed reference frame from the inertial navigation system-GPS receiver combination;

(b) calculating the directions from the one or more observation points to a target point for which the position vector in the earth-fixed reference frame is known, the directions being specified in a model-based reference frame, the model-based reference frame having a vertical axis with a specified orientation with respect to a normal to an ellipsoidal model of the earth and having horizontal axes with specified orientations with respect to the earth-fixed reference frame;

(d) orienting the direction-finding apparatus to point in the direction of the target point for each of the one or more observation points;

(e) determining the pointing direction of the direction-finding apparatus in the gravity-based reference frame;

(f) determining the relative orientation of at least one axis of the gravity-based reference frame and at least one axis of the model-based reference frame.

17. A method for using the apparatus of claim 9, the instrument reference point being sequentially at a plurality of observation points, the method comprising the steps:

(a) determining the relative orientation of the model-based and gravity-based INS reference frames, the model-based reference frame having a vertical axis with a specified orientation with respect to a normal to an ellipsoidal model of the earth and having horizontal axes with specified orientations with respect to the earth-fixed reference frame, the gravity-based reference frame having a vertical axis with a specified orientation with respect to the gravity vector and having horizontal axes with specified orientations with respect to the earth-fixed reference frame;

(b) obtaining the position vectors for the plurality of observation points in the earth-fixed reference frame from the INS-GPS receiver combination;

(c) orienting the direction-finding apparatus to point in the direction of a target point for each of the plurality of observation points;

(d) determining the pointing direction of the direction-finding apparatus for each of the plurality of observation points;

(e) determining the position vector in the earth-fixed reference frame for the target point utilizing the plurality of pointing directions determined in step (d).

* * * * *